United States Patent [19]

Lipman

[11] Patent Number: 4,981,363

[45] Date of Patent: Jan. 1, 1991

[54] EMERGENCY LIGHT/SPOTLIGHT MECHANISM FOR AUTOMOTIVE VEHICLES

[76] Inventor: Leonard H. Lipman, 1410 Magnolia, Kingwood, Tex. 77339

[21] Appl. No.: 458,170

[22] Filed: Dec. 28, 1989

[51] Int. Cl.$^5$ ............................................. B60Q 3/00
[52] U.S. Cl. ...................................... 362/68; 362/66; 362/80.1; 362/135; 362/240
[58] Field of Search ................... 362/80.1, 61, 66, 68, 362/285, 240, 244, 245, 368, 372, 135; 340/471, 472; 116/2

[56] References Cited

U.S. PATENT DOCUMENTS

| | | | |
|---|---|---|---|
| 1,553,959 | 9/1925 | Pirkey | 362/80.1 |
| 1,674,340 | 6/1928 | Wock | 362/74 |
| 1,738,632 | 12/1929 | Berge | 362/66 |
| 1,866,185 | 7/1932 | Yarnell | 362/80.1 |
| 2,017,798 | 10/1935 | Gillespie | 362/80.1 |
| 2,901,595 | 8/1959 | Shosted | 362/68 |
| 3,179,791 | 4/1965 | Mole | 362/793 |
| 3,434,107 | 3/1969 | Pfund | 362/66 |
| 3,665,392 | 5/1972 | Annas | 348/67 |
| 4,353,110 | 12/1982 | Ellis | 362/66 |
| 4,449,167 | 5/1984 | Cohen | 362/80.1 |
| 4,543,622 | 9/1985 | Menke et al. | 362/219 |
| 4,602,230 | 7/1986 | Tomkin et al. | 362/80 |
| 4,620,268 | 10/1986 | Ferenc | 362/74 |
| 4,654,757 | 3/1987 | Birkhauser | 362/80.1 |
| 4,724,515 | 2/1988 | Matsuki et al. | 362/80 |
| 4,779,168 | 10/1988 | Montgomery | 362/66 |

Primary Examiner—Ira S. Lazarus
Assistant Examiner—Richard R. Cole
Attorney, Agent, or Firm—James L. Jackson

[57] ABSTRACT

A windshield mounted combination emergency light/spotlight mechanism for automotive vehicles such a police cruisers, fire trucks, ambulances, etc. includes a housing which is mounted by bonded supports to the inner surface of the windshield, preferably at the same location normally occupied by a centrally located rearview mirror. Within the housing is located a movable spotlight and a pair of flashing emergency lights which can be incandescent lights or strobe lights. Filters are also located within the housing to provide colored flashing light. The spotlight, which may be a high intensity halogen spotlight, is mounted to a pivotal support which is selectively movable by a mechanical or electrical mechanism actuated by a manually actuated control lever. The housing fits intimately with the inner surface of the windshield and prevents rearward reflection or refraction of light into the automotive vehicle. The housing is also provided with a mirror stud to which may be secured a rearview mirror assembly and is provided with manually operable on-off switches for selective illumination of the spotlight and emergency lights. Radio and or remote control circuits may also be provided to permit operation of the spotlight and emergency lights from a location outside of the emergency vehicle.

27 Claims, 3 Drawing Sheets

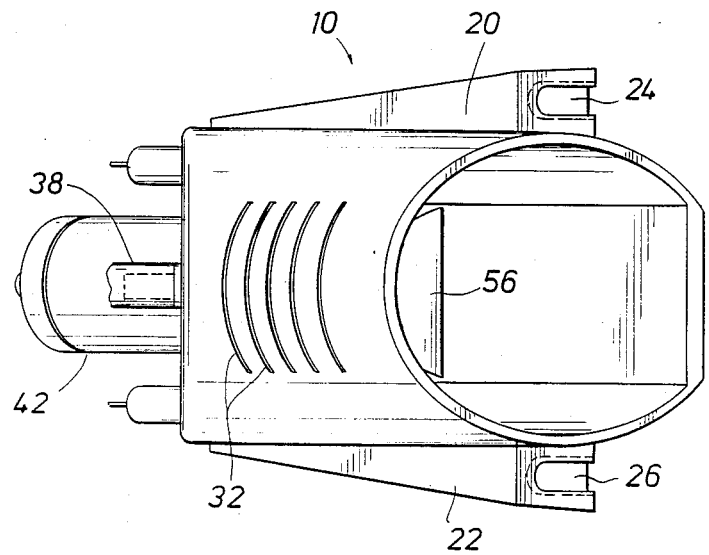
FIG. 2
FIG. 1
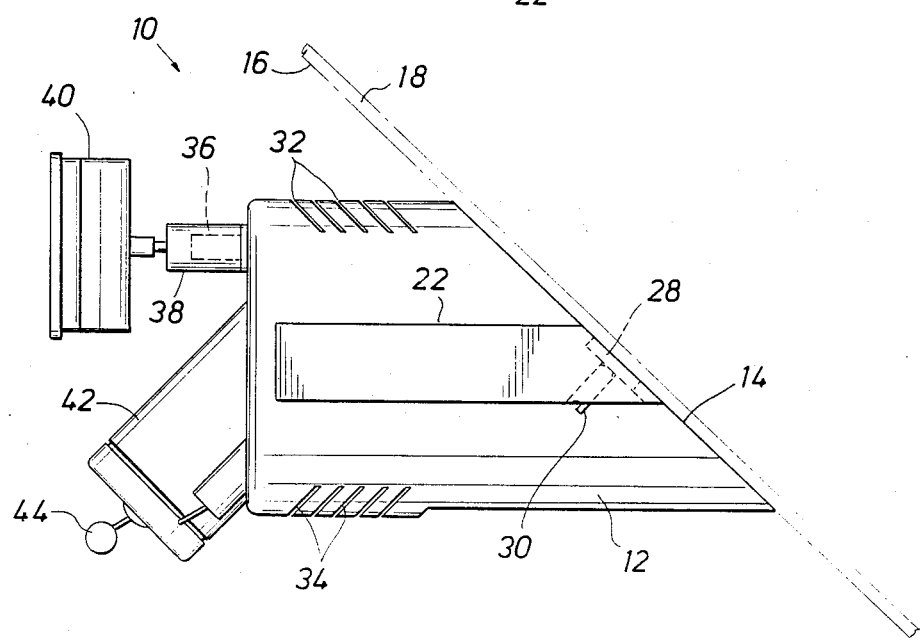
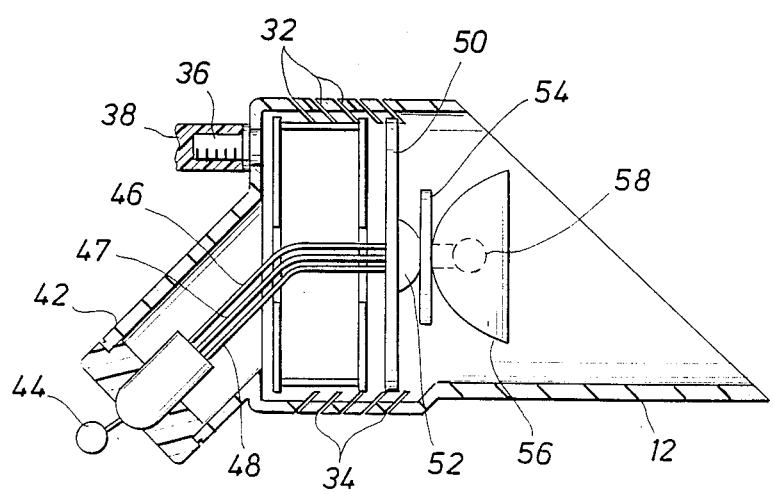
FIG. 3

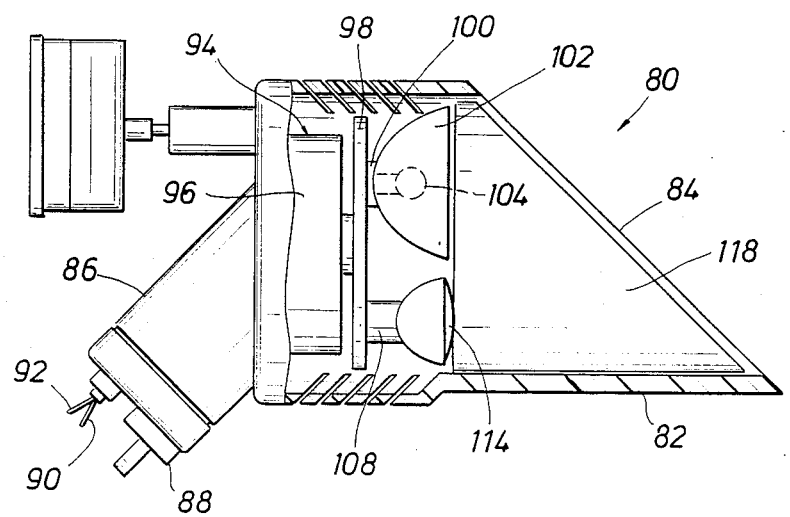
FIG. 7
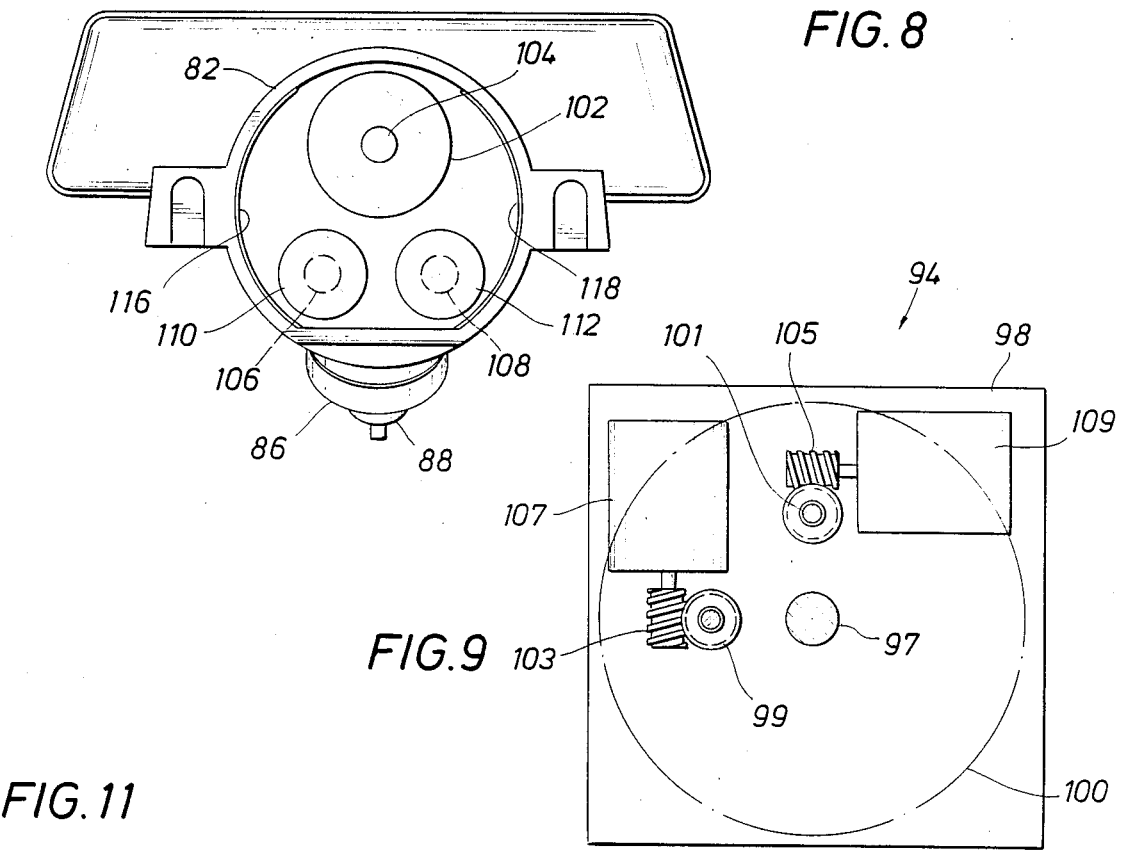
FIG. 8
FIG. 9
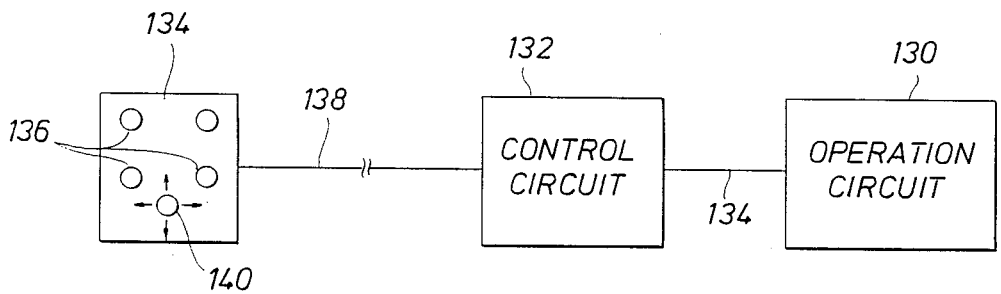
FIG. 11

EMERGENCY LIGHT/SPOTLIGHT MECHANISM FOR AUTOMOTIVE VEHICLES

FIELD OF THE INVENTION

This invention relates generally to emergency light systems and spotlight systems such as are utilized on police, ambulances, fire trucks and the like to attract attention and to provide warning during emergency conditions. More specifically, this invention is directed to a combination emergency light/spotlight system that is readily adapted for attachment to the front and/or rear glass wind screens of various types of automotive vehicles and which also provides for support of a rearview mirror thereby enabling the light system to be mounted in the location ordinarily occupied by a conventional rearview mirror of an automotive vehicle.

BACKGROUND OF THE INVENTION

Most emergency vehicles such as police cars, ambulances, fire trucks, etc. are provided with externally mounted emergency lights to attract the attention of motorists. Typically these lights are mounted in elevated position at the upper portion of the emergency vehicle such as in the case of flashing light systems for conventional police cruisers. If the emergency vehicle is extremely close to the rear of an automobile traveling in the same direction, the emergency light s may be above the range of visibility that is ordinarily permitted by the conventional rearview mirror system of the automobile. In such case, the driver of the automobile may not be aware that an emergency activity is in progress and therefore may unintentionally impede the emergency operation. Location of emergency lights at the roof of an emergency vehicle permits the lights to be visible from all directions. Though such is desired in many cases, in some cases it is detrimental to the intended use of the vehicle, i.e. unmarked police cars. In a few cases, the emergency lights are also located at the lower portion of automotive vehicles such as near the front bumper, in the grill work, etc. Here again, if the emergency vehicle is real close to the rear of an automobile traveling in the same direction, the emergency lights may be below the range of rear view vision of the driver of the automobile. The most logical location for emergency lights would then be at a location within the perimeter defined by the front wind screen or windshield of the emergency vehicle so that the location of the lights is always within the line of sight of a preceding motorist whether the emergency vehicle is far away or close to the rear of the motorist's vehicle. Obviously, this is not done in most cases because the emergency lights could then interfere with forward visibility through the windshield of the emergency vehicle.

In some cases, especially in the case of unmarked police vehicles, various emergency lighting systems may be provided inside the vehicle where they are not easily seen unless the emergency lights are being used. In other cases the officers using automobiles of this type will be provided with portable emergency lights that may be used inside the automobile or may be temporarily supported by magnets at the top of the automobile. Where emergency lighting systems are utilized inside the automobile they are typically considered undesirable because the light thereof is reflected inside the automobile and interferes with the visibility of the occupants. It is desirable, therefore, to provide an emergency lighting system that is usable inside an automotive vehicle and yet prevents reflected and refracted light from interfering with the visibility of the occupants and wherein the light units do not interfere with forward visibility through the windshield of the emergency vehicle.

In most cases spotlights for emergency vehicles are externally mounted and are typically controlled by a mechanical system that is operable from inside the automotive vehicle through manual manipulation of a control arm. These spotlights are independently mounted and actuated and are seldom used on unmarked police vehicles because of the attention they attract. It is desirable therefore to provide a spotlight mechanism that is mounted inside the vehicle and is movable so that it can be effectively used to light objects to the front and side of the vehicle. It is also desirable to provide an inside mounted spotlight mechanism that is manually controllable from inside the vehicle and may also be remotely controlled from locations outside the vehicle. It is also desirable to provide an inside mounted emergency light/spotlight system that also serves as a rearview mirror support and is intended to be mounted at a location normally occupied by a conventional centrally mounted rearview mirror and thus does not interfere with forward visibility through the windshield.

It is considered desirable to provide an inside mounted combination emergency light/spotlight assembly that may be mounted to the rear windshield of emergency vehicles as well as to the front windshield to thus provide additional emergency light visibility for attracting the attention of following motorists.

SUMMARY OF THE INVENTION

It is a primary feature of the present invention to provide a combination emergency light/spotlight system for emergency vehicles which is adapted to be mounted to the front and/or rear glass windshields to provide both a spotlight and emergency light capability in one lighting system.

It is another feature of this invention to provide a novel combination emergency light/spotlight system which is adapted to be mounted to the glass windshield within an automotive vehicle in such a manner that all light is directed through the windshield and outwardly, thus preventing any reflected or refracted light interference, with the visibility of the occupants of the vehicle.

It is an even further feature of this invention to provide a novel combination emergency light/spotlight system wherein the spotlight may be actuated manually such as by means of an electrically or manually actuated system and may, if desired, be operated from a location externally of the automobile.

It is another important feature of this invention to provide a novel windshield mounted combination emergency light/spotlight mechanism that is adapted to be located substantially at eye level of an automotive vehicle and centered within the windshield such that the light thereof is readily visible to the drivers of preceding automobiles when the driver is looking normally through a rearview mirror.

It is also a feature of this invention to provide a novel combination emergency light/spotlight mechanism that provides support for a rearview mirror to thus permit its positioning substantially at the upper centralized location of a conventional rear view mirror.

Briefly, the combination emergency light/spotlight system has two basic functions. The first is a warning light intended for stopping vehicles or alerting traffic to an approaching emergency vehicle. This is accomplished by both the color of the lights and their ability to flash. Since commonly accepted warning lights use red and blue colors, the emergency lights of this light employs these colors as well. The lights flash in an alternating pattern so that a blue-red-blue flashing sequence is established. The emergency lights of this unit may also utilize amber colored filters for other than police, emergency medical service (EMS), or fire vehicles. In order to achieve the best visibility, this emergency light/spotlight system is designed for glass mounting to thus enable the light system to be installed in supported relation by the inner surface of the glass windshield of an automotive vehicle. The existing rearview mirror of the automotive vehicle is removed and two mounting pads are bonded to the inner surface of the glass. The light system is attached in interlocking relation to these mounting pads and can easily be removed for repair or vehicle change. The rearview mirror is relocated to the back of the housing structure for the light by means of a built-in threaded stud that projects from the rear portion of the housing. This location allows the light to be positioned at eye level, which is a very important feature of this design. When approaching a vehicle from the rear, the emergency flashing lights are easily seen in the rearview mirror of the car in front of the police unit. If a police vehicle is directly behind a car, the light from its roof mounted light bar may not be noticed because it is above the field of vision afforded by a conventional inside mounted rearview mirror. The light output of the emergency light/spotlight assembly of this invention is visible either at close range or from a significant distance.

The second function of the light system of this invention is a white spotlight which is selectively movable under the control of the operator. The beam of this spotlight can be adjusted either by a push-pull cable system through manipulation of a simple mechanically interconnected control lever (joy stick). Alternatively, the spotlight of the light system may be electrically operated by electric biaxial motors mounted on a platform motor having their circuitry controlled by means of a manually operable control lever or joy stick. Alternatively, a single electric motor having a clutch to result in a two axis movement may be employed for positioning of the spotlight. The joy stick is positioned on the rear portion of the housing structure of the apparatus, i.e., near the usual position of a rearview mirror, making it readily available for manual adjustment by the operator as desired. In either of the mechanical or motor operated light positioning systems, a small joy stick on the back of the control pod enables the operator to manipulate the spotlight to thus allow an officer to sweep a stopped car with the beam of the spotlight before exiting the police vehicle. This ensures &he safety of the officer and enables the officer to identify specific features of the stopped vehicle, such as the license plate number. Also, if desired, a motor having a remote control feature may be employed having remote control to thus enable the operator of the vehicle to change the position of the spotlight by means of a remote control switch interconnected with the circuitry of the light by a long control cord. In the alternative, radio signals from a compact hand held transmitter to an appropriate receiver coupled in controlling relation with the servo motor will enable the spotlight to be remotely adjusted as desired. This feature allows the spotlight position to be controlled from various positions inside and outside the vehicle. An example would be if something suspicious is seen in a stopped car, the light can be remotely moved to that area without the officer being in the police car. Since the light is controlled electrically, the light could also be situated in the rear window of a control car and the flashing pattern and/or spotlight controlled from the driver's position.

The light assembly itself is very compact, and when attached to the inside surface of the windshield, is almost undetectable when the lights are not illuminated. This allows its effective use in unmarked police vehicles. If two emergency light/spotlight units were mounted to the front and back windshields of the emergency vehicle, the flashing emergency lights and spotlights would be highly visible in use, yet almost unnoticed when the lights are turned off.

Although the spotlight will be steadily illuminated during its normal use, it can also be made to flash such that it provides a flashing white light for the purpose of attracting attention. The flashing red and blue lights may be in the form of incandescent lights or the higher intensity halogen lights if desired, but more preferably, they will take the form of xenon strobe lights that can be controlled to flash according to a particular sequence or selected sequence. For example, each of the lights may be made to render a double flash for enhanced attention that compensates for the short duration of signal flashing strobe lights. The flashing lights are typically white flashing lights that are utilized with color filters to achieve the desired red and blue or amber colors.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a side elevational view of a combination emergency light/spotlight constructed in accordance with the present invention shown being supported by the glass windshield of an automotive vehicle and further shown to have a mirror assembly in supported relation therewith.

FIG. 2 is a plan view of the invention of FIG. 1.

FIG. 3 is a sectional view taken along 3—3 of FIG. 5 illustrating a mechanical assembly for imparting controlling movement to the spotlight thereof.

FIG. 7 is a sectional view of an emergency light/spotlight mechanism representing an alternative embodiment of this invention incorporating incandescent flashing lights and a biaxial motorized spotlight positioning mechanism.

FIG. 8 is a front elevational view of the invention shown in FIG. 7.

FIG. 9 is a diagrammatic illustration of a motorized biaxial spotlight positioning mechanism such as that employed in connection with the embodiment of FIG. 7.

FIG. 11 is an electrical block diagram schematic illustration of a remote control circuit for the electrically energized and controlled embodiment of FIGS. 7-9 hereof.

DETAILED DESCRIPTION OF PREFERRED EMBODIMENT

Figure 4:
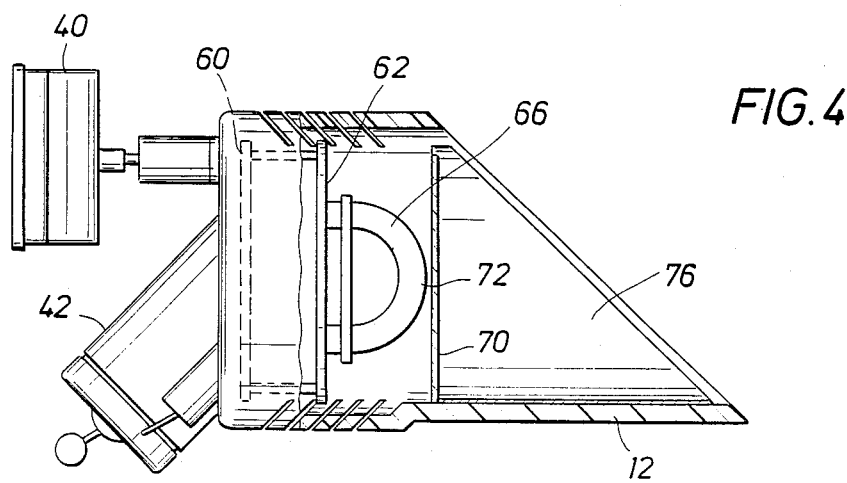
FIG. 4 is a sectional view taken along line 4—4 of FIG. 5 and illustrating one of the strobe light tube elements thereof.
Figure 5:
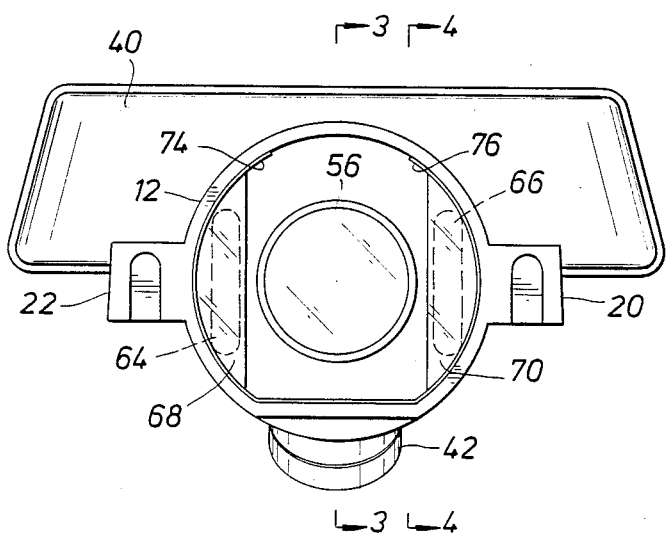
FIG. 5 is a front elevational view of the emergency light/strobe light mechanism of FIGS. 1-4.

Referring now to the drawings and first to FIGS. 1 and 2 a combination emergency light/spotlight mechanism may take the form generally illustrated at 10 incorporating a generally cylindrical housing 12 having a tapered forward extremity 14 corresponding intimately to the angle of inclination of the inner surface 16 of a glass windshield 18. The housing 12 incorporates a pair of opposed mounting wings 20 and 22 forming undercut receptacles 24 and 26 that are adapted to receive respective pairs of mounting supports or pads 28 which are affixed by bonding to the inner surface 16 of the windshield. The mounting wings are locked to the mounting supports by means of set screws 30 to thereby secure the housing 12 in releasable assembly with the mounting supports and thus in releasable supported relation with the inner surface of the windshield.

Because a certain amount of heat will be generated within the housing especially during operation of the spotlight, which will typically be a high intensity halogen spotlight, the housing 12 forms upper and lower cooling slots 32 and 34 permitting air to circulate upwardly through the housing by means of convection. If desired, to prevent contamination of the internal mechanical and electrical components of the housing by dust and other airborne debris, suitable filters may be placed to form inner coverings for the slots 32 and 34.

At the rear portion of the housing 12 is provided a mirror mounting stud 36 which is adapted to receive the mounting supports 38 of a mirror assembly 40. The mirror assembly is of the type and character currently utilized as the interior rearview mirror of most automotive vehicles and it may take any suitable form within the spirit and scope of the present invention.

From the rear portion of the housing 12 extends a control pod 42 which may be of generally cylindrical form if desired. The control pod forms a mounting housing for a control lever or "joy stick" 44 which is manipulated manually to impart controlling movement to respective control cables 46, 47 and 48. A mounting base 50 is fixed within the housing 12 and provides support for a pivot mount 52 by which a spotlight support plate 54 is pivotally mounted. A light reflector 56 is supported by the movable plate 54 and focuses light from a halogen light bulb 58 forwardly to form a spotlight beam of high intensity that projects through the windshield 18. Since the housing 12 fits intimately to the inner surface 16 of the windshield 18, reflected or refracted light can not project rearwardly into the automotive vehicle to interfere with the visibility of personnel therein. Since the joy stick for controlling the position of the spotlight reflector 56 is located slightly below the level of the rearview mirror assembly 40 the joy stick will be positioned for relatively easy manual access by the operator of the vehicle. The joy stick may be easily manually manipulated even while the automotive vehicle is being operated on a roadway to thus provide the operator with the capability of directing the spotlight beam upwardly, downwardly, or to the side to the full extent of its movement to thereby provide effective visibility as needed.

Figure 6:
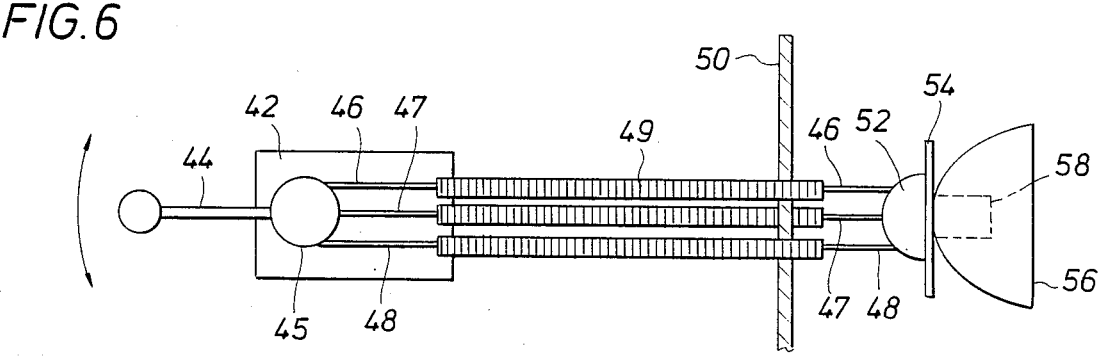
FIG. 6 is a diagrammatic illustration of a cable actuation system such as that employed in FIG. 3 for achieving positioning of the spotlight of the combination emergency light/spotlight mechanism.

Referring now particularly to FIG. 4, it is desirable that the emergency light/spotlight mechanism of this invention have the capability of providing appropriately colored flashing lights for the purpose of attracting attention. According to FIG. 4, these flashing lights may take the form of strobe lights which can be arranged to flash in any desirable sequence according to the control circuitry thereof. As shown in FIGS. 6 and 7, these flashing lights may take the form of incandescent lights which also may be arranged to flash in any suitable sequence. To provide the typical red and blue color ordinarily used by emergency vehicles such as police cruisers and the like, appropriately colored filters may be provided. In the case of police cruisers and other such emergency vehicles the colored filters will typically be red and blue. In the case of highway maintenance vehicles the colored filters may be of amber color or of any other suitable color. Further, it also within the scope of this invention to provide movable colored filters such that colored light or white light may be provided at the selection of the user.

In addition to the spotlight mechanism illustrated in FIG. 3, the combination emergency light/spotlight assembly incorporates a pair of flashing light elements, one of which is illustrated in FIG. 4. Within the housing 12 is mounted a pair of printed circuit boards 60 and 62 which are provided with the various electric circuitry components for timed sequence energization of a pair of strobe light tubes 64 and 66. The strobe tubes are supported within the housing 12 such as by the printed circuit board 62 or by any other suitable means of support. The strobe tubes are illuminated by the circuitry of the printed circuit boards 60 and 62 and will flash in an alternating sequence and perhaps a double flashing sequence as desired for suitably attracting attention. Colored filters 68 and 70 are fixed within the housing in such manner as to cover the exposed curved end portions 72 of the strobe tubes. Thus, as the white light from the strobe tubes is emitted the colored filters 68 and 70 cause the light to have the character of color that is desired. A pair of reflector elements 74 and 76 are fixed to the inner side wall surfaces of the housing 12 and serve to reflect light from the exposed portions of the strobe tubes forwardly and angularly such that the light from the strobe tubes can be seen by persons who are located in considerably angular relationship with the combination emergency light/spotlight unit.

Referring now to FIG. 6, the control cable system for the manually operated emergency light/spotlight mechanism is shown wherein the control pod 42 provides support for a spherical pivot 45 that forms the inner extremity of the joy stick 44. The three control cables, 46, 47 and 48 are connected in substantially tangential relation to the spherical pivot 45 at locations substantially 120° apart. These control cables then extend through appropriate cable housings 49 having end portions thereof supported by the thrust plate 50. The opposite ends of the cables 46, 47 and 48 are connected in substantially 120° spaced relation to outer peripheral portions of the reflector pivot 52 as shown. The spotlight support base 54 is disposed in fixed relation with respect to the pivot 52 and is thereby pivotally movable therewith about a pivot point forming the center of rotation of the spherical surface portion of the pivot 52. The reflector 56 and the light bulb 58, being disposed in fixed relation with the spotlight support base 54 are therefore pivotal along with the base in response to appropriate pivotal manipulation of the joy stick 44.

Referring now to FIGS. 6 and 7 an emergency light/spotlight mechanism is shown generally at 80 which represents an alternative embodiment of the present invention. The unit 80 includes a housing structure 82 which is of essentially the same configuration as shown in FIG. 1, the housing being angulated as shown in FIG. 6 to define an elliptical surface 84 intended to be disposed in intimate engagement with the inner surface of a windshield such as that shown at 18 in FIG. 1. The housing defines mounting wings such as shown at 22 and 24 in FIG. 2 for locked assembly with windshield supported mounting pads. From the rear portion of the housing 82 projects a control pod 86 having a motor control switch 88 projecting from the rear portion thereof for the purpose of spotlight actuation and also having switches 90 and 92 projecting therefrom for the purpose of selective illumination of the flashing lights and the spotlight.

As shown in FIG. 9 the electrically energized motor control mechanism for the apparatus of FIGS. 7 and 8 defines a support base 98 as shown in FIG. 7, having a reflector base 100 supported in movable relation therewith by means of a center pivot 97. Fixed worm gears 99 and 101 project from the reflector base and are disposed in driven relation by worm gears 103 and 105 which are in turn rotatably driven by means of electrically energized drive motors 107 and 109. As the respective drive motors are energized, the rotatable worm gears driven thereby induce linear driving movement to the respective fixed worm gears 99 and 101. This linear movement induces pivotal movement of the reflector base 100 about the pivot 97, thus changing the orientation of the reflector base 100 and the spotlight reflector 102 supported thereby. Although a two motor reflector controlling mechanism is illustrated in FIG. 9, the present invention is not intended to be limited in respect thereto. It is possible to employ a single motor drive mechanism for control of a movable reflector base such as that shown at 100 by means of a pair of gear trains that are selectively energized by a single motor with a solenoid clutch being incorporated to provide for selective driving relation including the motor and the respective gear trains. The flashing emergency lights may be fixed within the housing or mounted on the movable base 100 as desired.

As mentioned above, the emergency light/spotlight mechanisms of this invention may include manually operated spotlights such as that shown and described above in connection with FIGS. 1-5 or electrically controlled spotlights as shown in FIGS. 6 and 7. It should be born in mind, however, that the spotlight mechanisms of each of the embodiments incorporated herein may have manually or electrically controlled spotlights within the spirit and scope of the present invention. As shown in FIG. 6, within the housing 82 is fixed a three axis electric motor mechanism shown generally at 94 including a motor housing 96 having a light support plate 98 fixed at the forward end thereof. A spotlight support element 100 projects forwardly from the support plate 98 and provides a movable motor controlled mounting support for a spotlight reflector 102 having an incandescent high intensity light bulb 104 positioned in centrally located relation therein. The reflector support 100 is movable by the three axis electric motor mechanism under the control of a spotlight control switch 88 which functions in the manner of an electrical joy stick to selectively actuate the motors of the motor mechanism 94 to thus impart controlling movement to the spotlight reflector 102. At the lower portion of the support plate 98 is located a pair of colored light projections 106 and 108 each providing support for respective flashing incandescent lights 110 and 112 respectively. To provide observers with visual awareness of the flashing emergency lights the lights 110 and 112 are provided with appropriately colored filters 114 which have the usual colors (red and blue or amber) that are conventional for police vehicles, ambulances, fire trucks, etc. Reflector elements 116 and 118 are fixed to opposed inner surfaces of the housing 82 to thus reflect light from the colored flashing lights 110 and 112 in angular relationship so as to make these lights visible by persons who might be located to the front and side of the emergency vehicle.

Figure 10:
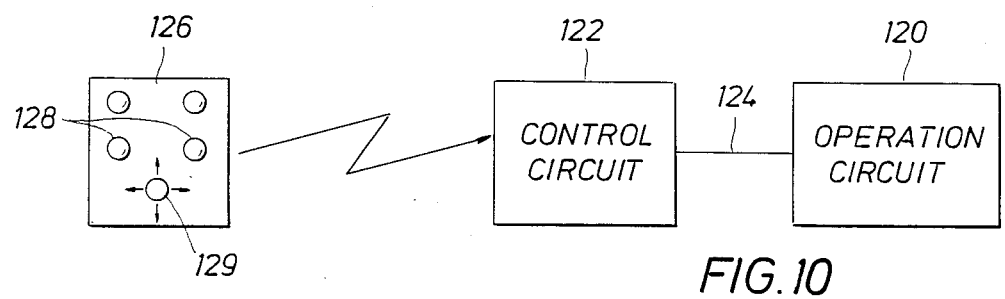
FIG. 10 is an electrical block diagram schematic illustration of a radio control circuit for the electrically energized and controlled embodiment of FIGS. 7-9 hereof.

Referring now to FIG. 10 a radio controlled embodiment of the invention is illustrated schematically by way of block diagram wherein a biaxial electric motor mechanism is shown by the block diagram 100 and which incorporates one of more electric motors such as shown at 105 and 107 and the electrical circuitry for operation and control thereof. A radio receiver circuit 122 is provided which is coupled by appropriate conductor means 124 to the motor operation and control circuitry 120. A remote transmitter 126 is provided which may be in the form of a hand held radio signal transmitter having selective control buttons 128 which are manually manipulated in order to transmit appropriate radio signals to the receiver unit 122. A joy stick operated directional control circuit 129 is provided for control of the electric motor or motors. If desired, the receiver unit may be separate from the housing structure 182 or may be incorporated in the housing as desired. By manipulating the control buttons 128 the spotlight and the emergency lights of the unit may be selectively activated and the positioning of the spotlight may be selectively controlled. This feature permits personnel located externally of the emergency vehicle to utilize both the emergency lights and the spotlight in selective fashion.

Referring now to FIG. 11 an electrical motor operating circuit 130 is illustrated by the block diagram schematic and an electrical control circuit is illustrated at 132 which is coupled with circuitry 130 by means of appropriate conductors 134. A remote control unit 134 having control buttons 136 is electrically coupled with control circuitry 132 by means of an elongated conductor that may be extended a significant distance from the emergency vehicle to provide personnel with the capability of controlling both the emergency lights and the spotlight in selective fashion. Typically the conductor 138 will be a coil electrical conductor having appropriate conductor wires for transmission of control signals from button actuated switches or contacts to the control circuitry 132. Typically, the control circuitry will be located within the housing 82 but it also may be located externally of the housing if desired. The control unit 134 may also employ a joy stick operated circuit 140 for directional control of the motor or motors.

In use, regardless of character of emergency light system, i.e., manually or electrically operated, the spotlight is energized by means of an appropriate on/off switch and the flashing colored lights are energized by actuating another on/off switch. The spotlight and the flashing lights may be energized at the same time, but more logically, they will be separately energized according to the particular use of the apparatus that is in progress. When the spotlight is energized, it may be manipulated either mechanically by means of the joy stick 44 in the case of the mechanically actuated apparatus of FIGS. 1-6 or by means of the motor control switch 88 in the case of the electric motor controlled apparatus of FIGS. 7-9 to thus impart movement to the spotlight reflectors 56 and 102 as the case may be. This will enable bright light from the spotlight to sweep an area while police or emergency personnel are located within the vehicle to thus provide for their security. The flashing lights such as the strobe tubes 64 and 66 and the incandescent lights 110 and 112 are separately controllable through manipulation of appropriate switches.

The emergency light/spotlight assembly will be mounted within a vehicle at essentially the same location as a conventional rearview mirror. Additionally, the mirror stud extending therefrom will provide for attachment of a conventional rearview mirror assembly to the rear portion of the light housing. This rearview mirror assembly may be utilized in the same manner as with conventional mirror mountings.

When it becomes necessary or appropriate to discontinue use of the vehicle, the emergency light/spotlight mechanism is simply removed by unthreading the set screws 30 and simply moving the housing to release its connection with the mounting supports. The mounting supports may then be removed from the inner surface of the windshield and a single mirror support may be attached thereto. A conventional mirror may then be assembled to the mirror support to return the automobile to its original configuration.

In view of the forgoing, it is seen that the present invention is well adapted to attain all of the features hereinabove set forth together with other objects and features which are inherent in the apparatus itself.

While the foregoing is directed to the preferred embodiment it is recognized that the apparatus may take on various other embodiments within the spirit and scope of the invention, the scope hereof is determined by the claims which follow.

What is claimed is:

1. A windshield mounted light mechanism for automotive vehicles, comprising:
   (a) housing means forming an end surface disposed for intimate engagement with the inner surface of the windshield of an automotive vehicle;
   (b) support means being bonded to said inner surface and supporting said housing in removable assembly with said windshield;
   (c) a light support defining a pivot and being movably disposed within said housing and being pivotally movable upwardly, downwardly and to the side about said pivot, said light support having at least one light emitting source supported thereby for projection of light forwardly through said windshield;
   (d) means controllable by the operator of the automotive vehicle for selectively imparting said pivotal positioning movement to said light support to controllably orient the direction of light emitting from said source through said windshield;
   (e) means controllable by the operator of said automotive vehicle for selectively energizing said light emitting source; and
   (f) a mirror mount being defined by said housing and adapted to receive a rearview mirror in supported relation thereby.

2. The windshield mounted light mechanism of claim 1, wherein:
   (a) said support means comprises a pair of mounting support elements being bonded to said inner surface of said windshield;
   (b) said housing forms a pair of mounting wings each forming a mounting receptacle adapted to receive a respective one of said mounting support elements in interlocking relation therewith; and
   (c) means securing said pair of mounting wings in locked assembly with said mounted support elements.

3. The windshield mounted light mechanism of claim 1, wherein said means for selectively imparting positioning movement to said light support comprises:
   a mechanical control mechanism being operatively interconnected with said light support and having a manually movable control lever being pivotally supported by said housing means and having control coupling means establishing positioning connection with said light support for imparting omnidirectional positioning control to said light support and said light emitting source.

4. The windshield mounted light mechanism of claim 3, wherein said mechanical control mechanism comprises:
   (a) a first pivot being positioned for omnidirectional movement within said housing and being interconnected with said light support;
   (b) a second pivot being supported for omnidirectional movement by said housing remotely from said first pivot and having said control lever connected therewith; and
   (c) a plurality of control cables interconnecting said first and second pivots and providing said light support with multi-axis position controlling movement about said first pivot.

5. The windshield mounted light mechanism of claim 1, wherein said means for selectively imparting positioning movement to said light support comprises:
   (a) electric motor means being coupled in multi-axis position controlling relation with said light support; and
   (b) an electrical control circuit for selectively energizing said electric motor means for achieving controlled omnidirectional pivotal positioning of said light support and said light source about said pivot in relation to said housing, said control circuit means incorporating a multi-axis control switch for selective energization of said electric motor means.

6. The windshield mounted light mechanism of claim 5, wherein said electrical control circuit includes:
   (a) a radio signal responsive control section coupled with said electrical control circuit; and
   (b) a remote radio signal transmitter for transmitting controlling radio signals to said radio signal responsive control section of said electrical control circuit for remote positioning control of said light emitting source.

7. The windshield mounted light mechanism of claim 5, wherein said electric control circuit includes:
   (a) a remote light positioning and energizing control; and
   (b) conductor means electrically interconnecting said remote light positioning and energizing control and said electrical control circuit and being of sufficient length for manual operation of said remote light positioning and energizing control externally of said automotive vehicle.

8. The windshield mounted light mechanism of claim 1, including:
   a rearview mirror being supported by said mirror mount of said housing means and positioned for rearward viewing by the operator of said automotive vehicle.

9. The windshield mounted light mechanism of claim 1, wherein said light emitting source is a spotlight for projecting a concentrated beam of light through said windshield for selective illumination of objects outside of said automotive vehicle.

10. The windshield mounted light mechanism of claim 9, wherein said spotlight comprises:
    (a) a light reflector being connected in immovable relation with said light support and being movable in multi-axis relation along with said light support, said light reflector having a light receptacle therein;
    (b) a high intensity light bulb being received by said light receptacle; and
    (c) an electrical circuit coupled with said light receptacle for energization of said high intensity light bulb and having a light switch for controlling energization thereof.

11. The windshield mounted light mechanism of claim 9 including:
    electrical circuit means coupled with said light receptacle and being selectively energized for inducing sequential flashing of said spotlight.

12. The windshield mounted light mechanism of claim 1, including:
    (a) emergency light means being disposed in space relation within said housing means and adapted to emit light of predetermined color through said windshield for attracting attention to said automotive vehicle; and
    (b) emergency light circuit means being coupled with said emergency light means, said emergency light circuit means achieving sequential flashing illumination of said emergency light means.

13. The windshield mounted light mechanism of claim 12, wherein said emergency light means comprise:
    (a) a pair of strobe lights disposed in spaced relation within said housing means and being supported by said support means and located on opposite sides of said light source, said strobe lights being adapted to emit flashes of white light; and
    (b) a pair of color filters of selected color being mounted in covering relation with said strobe lights and providing for emission of flashing colored light from said housing through said windshield.

14. The windshield mounted light mechanism of claim 13, including:
    reflector means forming interior surface means of said housing and reflecting said flashing colored light in forward angular direction through said windshield to provide wide flashing light visibility.

15. The windshield mounted light mechanism of claim 12, wherein said emergency light means comprise:
    (a) a pair of emergency incandescent light sources being disposed in spaced relation within said housing and being located on opposite sides of said light emitting source; and
    (b) a pair of color filters being positioned within said housing such that light from said emergency incandescent light sources is colored as desired for attracting attention to said automotive vehicle.

16. The windshield mounted light mechanism of claim 15, including:
    reflector means forming interior surface means of said housing means and reflecting said flashing colored light in forward angular direction through said windshield to provide wide flashing light visibility.

17. A windshield mounted light mechanism for automotive vehicles, comprising:
    (a) housing means forming an end surface disposed for intimate engagement with the inner surface of the windshield of an automotive vehicle;
    (b) support means adapted to be bonded to said inner surface of said windshield for supporting said housing in removable assembly with said windshield;
    (c) a light support defining a pivot being movably supported by said support means within said housing and being pivotally movable upwardly, downwardly and to each side in omnidirectional manner about said pivot, said light support having at least one spotlight emitting source supported thereby for projection of a concentrated light beam through said windshield;
    (d) means controllable by the operator of the automotive vehicle for selectively imparting pivotal positioning movement to said light support to controllably orient the direction of said concentrated beam of light emitting from said source through said windshield;
    (e) means controllable by the operator of said automotive vehicle for selectively energizing said spotlight emitting source;
    (f) emergency light means being positioned within said housing means and adapted to project light through said windshield; and
    (g) an emergency light circuit coupled with said emergency light means for sequential flashing illumination thereof.

18. The windshield mounted light mechanism of claim 17, wherein said means for selectively imparting positioning movement to said light support comprises:
    a mechanical control mechanism being operatively interconnected with said light support and having a manually movable control lever being pivotally supported by said housing means and having control coupling means establishing positioning connection with said light support for imparting omnidirectional positioning control to said light support and said light emitting source.

19. The windshield mounted light mechanism of claim 18, wherein said mechanical control mechanism comprises:

(a) a first pivot being positioned for multi-axis movement within said housing and being interconnected with said light support;
(b) a second pivot being supported for multi-axis movement by said housing remotely from said first pivot and having said control lever connected therewith; and
(c) a plurality of control cables interconnecting said first and second pivots and providing said light support with multi-axis position controlling movement about said first pivot.

20. The windshield mounted light mechanism of claim 17, wherein said means for selectively imparting positioning movement to said light support comprises:
(a) electric motor means being coupled in multi-axis position controlling relation with said light support; and
(b) an electrical control circuit for selectively energizing said electric motor means for achieving controlled pivotal positioning of said light support and said light source about said pivot in relation to said housing, said electrical control circuit incorporating a multi-axis control switch for selective energization of said electric motor means by the operator of said automotive vehicle.

21. The windshield mounted light mechanism of claim 20, wherein said electrical control circuit includes:
(a) a radio signal responsive control section coupled with said electrical control circuit; and
(b) a remote radio signal transmitter for transmitting controlling radio signals to said radio signal responsive control section of said electrical control circuit for remote positioning control of said light emitting source.

22. The windshield mounted light mechanism of claim 20, wherein said electrical control circuit includes:
(a) a remote light positioning and energizing control; and
(b) conductor means electrically interconnecting said remote light positioning and energizing control and said electrical control circuit and being of sufficient length for manual operation of said remote light positioning and energizing control externally of said automotive vehicle.

23. The windshield mounted light mechanism of claim 17, wherein said emergency light means comprises:
(a) a pair of emergency light disposed in spaced relation within said housing means each adapted to emit light of predetermined color for attracting attention to said automotive vehicle; and
(b) an emergency light circuit being disposed within said housing means and being coupled with said emergency lights, said emergency light circuit means achieving sequential flashing illumination of said emergency lights.

24. The windshield mounted light mechanism of claim 23, wherein said pair of emergency lights comprise:
(a) a pair of spaced emergency incandescent light sources; and
(b) a pair of color filters being positioned within said housing such that light from said spaced emergency incandescent light sources is colored for attracting attention to said automotive vehicle.

25. The windshield mounted light mechanism of claim 17, wherein:
a flash control circuit is coupled with said spotlight emitting source and is selectively actuatable to induce sequential flashing of said spotlight emitting source.

26. The windshield mounted light mechanism of claim 17, including:
a mirror mount being defined by said housing means and adapted to receive a rearview mirror in supported relation thereby.

27. The windshield mounted light mechanism of claim 17, including:
a rearview mirror being supported by the rear of said housing means.

* * * * *